US008070849B2

(12) United States Patent
Sahajwalla

(10) Patent No.: US 8,070,849 B2
(45) Date of Patent: Dec. 6, 2011

(54) PRODUCTION OF FERRO-ALLOYS

(75) Inventor: Veena Sahajwalla, Sydney (AU)

(73) Assignee: Newsouth Innovations Pty Limited, Sydney, New South Wales (AU)

( * ) Notice: Subject to any disclaimer, the term of this patent is extended or adjusted under 35 U.S.C. 154(b) by 0 days.

(21) Appl. No.: 12/596,772

(22) PCT Filed: May 7, 2008

(86) PCT No.: PCT/AU2008/000637
§ 371 (c)(1),
(2), (4) Date: Feb. 24, 2010

(87) PCT Pub. No.: WO2008/134822
PCT Pub. Date: Nov. 13, 2008

(65) Prior Publication Data
US 2010/0147108 A1    Jun. 17, 2010

(30) Foreign Application Priority Data
May 7, 2007   (AU) .................... 2007902386

(51) Int. Cl.
C21B 13/12    (2006.01)
C22B 7/00     (2006.01)
(52) U.S. Cl. ...... 75/10.61; 75/10.63; 75/577; 241/24.25
(58) Field of Classification Search .................. 75/10.63, 75/10.61, 577
See application file for complete search history.

(56) References Cited

U.S. PATENT DOCUMENTS

| 4,030,984 | A |   | 6/1977  | Chambers |
|-----------|---|---|---------|----------|
| 4,175,949 | A |   | 11/1979 | Breznay |
| 4,889,556 | A |   | 12/1989 | Dighe |
| 5,186,740 | A |   | 2/1993  | Sancinelli |
| 5,244,490 | A | * | 9/1993  | Agarwal ..................... 75/500 |
| 5,322,544 | A |   | 6/1994  | Stebbing |
| 5,554,207 | A |   | 9/1996  | Bogdan et al. |
| 6,527,208 | B1 | * | 3/2003 | Callahan et al. .......... 241/24.11 |
| 2002/0094315 | A1 |  | 7/2002 | Mengel et al. |
| 2003/0066387 | A1 |  | 4/2003 | Stebbing |
| 2005/0229743 | A1 | * | 10/2005 | Stebbing ................... 75/10.61 |

FOREIGN PATENT DOCUMENTS

| EP | 0070040 A1  | 1/1983 |
| EP | 0353541 A2  | 2/1990 |
| JP | 03-191014 A | 8/1991 |
| JP | 2000-192161 A | 7/2000 |
| JP | 2002-241830 A | 8/2002 |
| JP | 2004-052002 A | 2/2004 |
| JP | 2004-232024 A | 8/2004 |
| JP | 2008-073635 A | 4/2008 |
| WO | 2006/024069 A1 | 3/2006 |

* cited by examiner

Primary Examiner — George Wyszomierski
Assistant Examiner — Tima M McGuthry Banks
(74) Attorney, Agent, or Firm — The Webb Law Firm

(57) ABSTRACT

A method for producing a ferro-alloy in an electric arc furnace is disclosed. The method comprises the steps of removing steel from a carbon-containing organic material, and charging the furnace with the carbon-containing organic material product.

16 Claims, 4 Drawing Sheets

Schematic Diagram of DTF

Schematic Diagram of DTF

Combustion efficiencies of coke/rubber and coke/PP mixtures.

XRD pattern (peak analysis) for 70% Metallurgical coke-30% SB Rubber after combustion.

PRODUCTION OF FERRO-ALLOYS

TECHNICAL FIELD

An improved method for producing ferro-alloys (such as steel) in an electric arc furnace (EAF) is disclosed. The method employs an additive which can enhance combustion efficiency of the EAF process. The additive may also function as a slag foaming agent, reducing agent, fuel and/or as a recarburiser.

BACKGROUND ART

Internationally, there are increasing problems with both plastics disposal and the disposal of waste products of plastic and rubber (such as tires). At the same time, the steel industry worldwide is facing pressure to minimise its impact on the environment, for example, by reducing fuel (typically coke) consumption.

U.S. Pat. No. 5,554,207 and JP2004-052002 each disclose a process in which electric arc furnace (EAF) waste dust is combined with waste plastic to form a solid, which is then added to the EAF. On the other hand, WO2006/024069 (to the present applicant) teaches the addition of an un-agglomerated carbon-containing polymer to an EAF.

In blast furnaces, plastic charging has been proposed as a substitute fuel and to reduce $CO_2$ emissions. Further, U.S. Pat. No. 4,175,949 discloses cutting up and charging worn pneumatic tyres into a blast furnace to replace some of the coke.

U.S. Pat. No. 5,322,544 discloses a method for melting steel using scrap metal and scrap automotive tires. In the method the scrap metal and whole scrap rubber tires are deposited in an electric arc furnace, and the whole scrap rubber tires are combusted with air or oxygen to provide an auxiliary source of heat to melt the scrap metal. This document teaches that whole scrap rubber tires are preferred so as to control combustion (ie. if shredded scrap rubber tires were used, the combustion would occur too rapidly and generate an undesirable amount of heat, and also fumes could escape from the EAF before the roof could be replaced). U.S. Pat. No. 4,175,949, on the other hand, teaches disintegrating the tires prior to charging, because excessive combustion and high heat can be accommodated (and are likely to be desirable) in a blast furnace.

US2003/0066387 discloses a process for melting steel using scrap metal and scrap rubber in an electric arc furnace. In this process, the scrap metal and scrap rubber (which can be whole, shredded or chopped) are combined and deposited into an electric arc furnace, and the rubber is combusted using oxygen or natural gas. This document teaches that the steel belts from rubber tires can be included in the scrap rubber, with the steel belts becoming part of the molten steel in the electric arc furnace. This document also teaches that whole scrap rubber tires are preferred so as to control the combustion rate.

In short, the prior art teaches that, when scrap rubber tires are introduced into a furnace, the steel present therein is also so introduced, whereby the addition of the steel is beneficial, in that it supplies additional steel to the furnace, and is not seen as detrimental.

SUMMARY OF THE DISCLOSURE

Contrary to the teachings of the prior art, in a first aspect there is provided a method for producing a ferro-alloy in an electric arc furnace, the method comprising the steps of:

(i) removing steel from a carbon-containing organic material that comprises steel; and
(ii) charging the furnace with the carbon-containing organic material product from step (i).

It has been observed in an EAF process that volatiles released from a carbon-containing organic material charged into the EAF play a role in enhancing EAF combustion efficiency. The product of (i) can better enhance the combustion efficiency of the EAF process because, if the steel is not removed, the combustion efficiency is proportionally lowered. This is due to a decreased proportion in volatiles that are released from the carbon-containing organic material. Where there is a greater proportion of the organic material then there is a greater proportion of volatiles released.

The enhanced combustion efficiency is also due to the fact that steel has a relatively lower carbon content than many carbon-containing organic materials, especially polymers and rubbers.

In addition, the volatile matter released from the organic materials provide, relative to steel, an enhanced surface area effect, this also improving combustion efficiency.

Absent steel, the product of (i), may also have improved function as a slag foaming agent (ie. causing better slag foaming in the EAF relative to a steel-containing material). In an electric arc furnace increased slag foaming better blankets the molten metal bath and better holds in bath heat (ie. insulates), and this leads to considerably reduced electricity consumption in the EAF.

Additionally, absent steel, the product of (i) may also have improved function as a reducing agent, as a fuel and/or as a recarburiser in the production of the ferro-alloy in the EAF. In this regard, the product of (i) may better cause a reduction of metal(s) oxides present in furnace feed and/or generated during metal processing; and/or act in an enhanced manner as a source of fuel, or as an enhanced recarburiser to increase the amount of carbon present with iron in the final ferro-alloy produced. For example, in electric arc furnaces, the primary fuel source has been electricity.

The product of (i) can thus enhance EAF combustion and energy efficiency (resulting in the use of less electricity), can reduce the consumption (and hence cost) of traditional carbon sources such as coke and coal, and may also replace or reduce the use of expensive EAF recarburisers such as anthracite coal and graphite.

In one form the carbon-containing organic material is a rubber material because, in industrial applications, such materials are more likely to be reinforced with steel (eg. steel-containing tires). However, the carbon-containing organic material may also comprise a polymer such as is found in a steel reinforced polymer composite (a relatively new family of composite materials). Such polymer composites can employ thermo-set and cementitious resin-based polymers and find structural and construction applications.

When the term "rubber" is used herein it is intended to include both synthetic and naturally derived rubber material. Synthetic rubber materials include polymers derived from the polymerization of monomers such as isoprene(2-methyl-1,3-butadiene), 1,3-butadiene, chloroprene(2-chloro-1,3-butadiene), and isobutylene(methylpropene). Natural rubber material is derived from natural latex from the Para rubber tree *Hevea brasiliensis* (Euphorbiaceae), and from plants containing latex such as figs (*Ficus elastica*), euphorbias, and the common dandelion.

When the term "ferro-alloy" is used herein it is intended to include a broad range of iron-carbon alloys (including steels) and other iron-carbon and/or iron-based alloys, including ferrochromium, ferrochromium silicon, ferromanganese, ferrosilicomanganese, ferrosilicon, magnesium ferrosilicon, ferromolybdenum, ferronickel, ferrotitanium, ferrophosphorous, ferrotungsten, ferrovanadium, ferrozirconium etc.

When the term "steel" is used herein (ie. in relation to the organic material that comprises steel) it is intended to include standard steel alloys, ferro-alloys (as defined above), and other metal materials that have a proportion or mix (whether large or small) of such steel and steel alloys.

In one form the step (i) removing of steel from the carbon-containing organic material comprises:
(a) comminuting the carbon-containing organic material comprising the steel; and
(b) separating the steel from the product of (a).

The step (a) comminution may comprise one or more of slitting, shredding, chipping, grinding or crumbing the material. For example, the material may be comminuted so as to produce a particle size of less than about 1 mm. Commercially available apparatus used for comminuting of plastics and tires may be employed.

The step (b) separating may comprise subjecting the comminuted product of (a) to a magnetic field (eg. in a commercially available magnetic separation unit) to magnetically remove the steel from the remainder of the comminuted product.

Thus, the material charged into the EAF can be in an optimal comminuted, ready-to-combust form.

In a most typical form the source of the carbon-containing organic material is a tire, with modern tires almost always comprising steel for increased strength and reinforcement. The tyre can be from any vehicle type. Thus, in step (i), the method comprises removing steel from a tire prior to charging it into the EAF. It should also be noted that tires are made of various rubber types such as natural rubber, isoprene rubber, styrene-butadiene rubber, butyl rubber, and chloroprene rubber. Styrene-butadiene rubber is the most common synthetic rubber and the most widely used for tire manufacture.

When charged into the furnace the carbon-containing organic material may at least partially combust and produce a carbonaceous residue. As it combusts, the organic material can act as a fuel. The carbonaceous residue can then oxidise to cause slag foaming. The residue may additionally function as a reducing agent or recarburiser. Thus, the carbon-containing organic material charged into the furnace can function as a slag foaming precursor. It may thus also function as a recarburiser precursor or reducing agent precursor.

Whilst in step (ii) the carbon-containing organic material may comprise the sole additive charged into the furnace, in one form the organic material is charged into the furnace with another source of carbon. This other source of carbon may itself combust to act a fuel. It may also contribute to slag foaming, and may function as a reducing agent or recarburiser. The other source of carbon can be coal, coke, carbon char, charcoal or graphite.

As an example, the carbon-containing organic material and other source of carbon can be charged into the furnace approximately in varying weight ratios such as 1:1, 3:7, 1:4, 1:9 etc. Also, the ultimately selected ratio may be determined with respect to the characteristics of a particular furnace.

In one form, the carbon-containing organic material is a waste material. The charging of a waste material into the furnace provides an effective means of disposal of the waste material, which otherwise poses environmental challenges.

In one form, the carbon-containing organic material comprises the atoms C, H and optionally O only. Whilst other elements may be present in the material (eg. N, S, P, Si, halogens etc) these other elements may interfere with ferro-alloy production and/or produce contaminants, pollutants, noxious gases etc. Thus, by judiciously selecting the carbon-containing organic material, the formation of noxious gases and other detrimental or harmful products can be avoided.

In a second aspect there is provided, in the production of a ferro-alloy in an electric arc furnace, the use of a carbon-containing organic material from which steel has been removed to enhance EAF combustion efficiency.

The use of the carbon-containing organic material can be in the production of a ferro-alloy according to the method of the first aspect.

In a third aspect there is provided a method for producing a ferro-alloy in an electric arc furnace, the method comprising the steps of:
charging the furnace with feedstock for the ferro-alloy;
heating the feedstock in the furnace to a molten state; and
charging the furnace with a carbon-containing organic material from which steel has been removed.

The carbon-containing organic material can be charged in a form so as to combust in the furnace and release heat energy to the molten alloy/feedstock and to generate a substance that foams the slag. In this regard, the carbon-containing organic material can be comminuted as per the first aspect.

The carbon-containing organic material can be charged with an additional agent. The additional agent may be the other source of carbon as defined in the first aspect.

The carbon-containing organic material may also be charged with the feedstock to the furnace. For example, the furnace can already be heated when the feedstock and carbon-containing organic material are charged therein (ie. in a continuous furnace operation mode).

The method of the third aspect may otherwise be as defined in the first aspect.

In a fourth aspect there is provided a method for producing a ferro-alloy in an electric arc furnace, the method comprising the steps of:
(i) comminuting a tire; and
(ii) charging the furnace with the product from step (i).

In the fourth aspect the tire can be comminuted by one or more of slitting, shredding, chipping, grinding or crumbing. Typically the tire is comminuted so as to produce a particle size of around 1 mm or less.

When comminuted and prior to charging, the tire can also be subjected to a separation step in which steel present in the tyre is removed.

In a fifth aspect a system is provided for determining the recyclability of a rubber in a ferro-alloy production furnace that employs a carbon-containing feedstock.

The system comprises the steps of:
deriving a value of a parameter of a rubber that is reflective of the rubber's ability to combust;
comparing that parameter to one or more parameter values derived from one or more other rubbers, polymers and/or a non-organic carbon sources;
developing a range or scale from those parameter values.

In one form, the parameter can be the amount of energy produced during combustion in the furnace (eg. calorific value).

BRIEF DESCRIPTION OF THE DRAWINGS

Notwithstanding other embodiments which may fall within the method for producing a ferro-alloy as defined in the Summary, specific embodiments of the method will now be described, by way of example only, with reference to the accompanying drawings in which:

FIG. 3(*b*) respectively shows XRD spectra of a carbonaceous residue for coke, and for a 70% coke, 30% tire rubber (SBR) mixture before and after being reacted in the drop tube furnace of FIG. 1.

DETAILED DESCRIPTION OF SPECIFIC EMBODIMENTS

Figure 1:
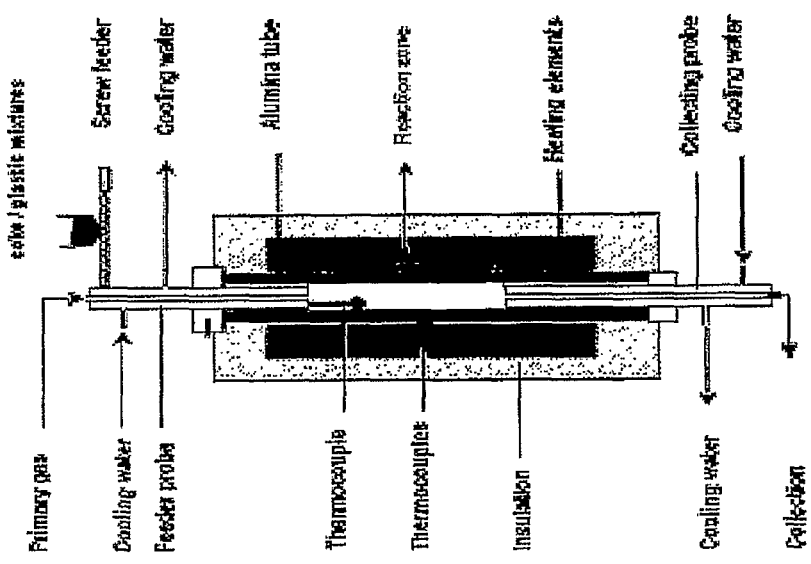
FIG. 1 shows a schematic diagram of a drop tube furnace (DTF) furnace set up to simulate an electric arc furnace, as described in Example 1.

During extensive studies of EAF steel production, it was noted that the use of carbon-containing organic materials, specifically polymers, in EAF steel making could provide for the following:

An auxiliary fuel or supplementary energy source. Inside the furnace, at very high operating temperatures, the polymeric chains breakdown. The scission products of these polymers are hydrocarbons of lower chain length, which readily undergo combustion, giving CO and $H_2$. The heat released during the combustion reaction can be utilized as supplementary energy.

A source of carbon. The carbonaceous residues after the coke/plastics mixtures have been burnt off can provide for effective slag foaming.

In a surprising development, it was postulated that a rubber (eg. from waste or scrap tires) could be introduced into EAF steel production. It was surmised that, at the high temperatures employed in EAF steel production, the rubber would, once introduced into the furnace, combust (thus acting as a fuel) and produce a carbonaceous residual product. However, the presence of steel in eg. rubber tires could detract from that effect, so investigations were conducted on rubber absent steel (ie. with the steel removed from the rubber prior to furnace charging). Subsequently, it was postulated that other carbon-containing polymers absent steel (eg. derived from waste steel-reinforced polymer composites) could also be introduced into the electric arc production of ferro-alloys and again produce a carbonaceous residual product.

It was further observed that the carbonaceous residual product could then cause slag foaming in EAF steel production, and might optionally also function as a reducing agent (eg. in the production of other ferro-alloys), and optionally also function as a recarburiser.

Structural characterisation of the carbonaceous residues was conducted on various coke-plastic and coke-rubber mixtures introduced into a drop-tube furnace (FIG. 1, simulating operating conditions that might be experienced in an EAF) to observe combustion efficiencies. The results are set forth in FIG. 2.

Analysis was also performed to ascertain the carbonaceous residues that would subsequently lead to foaming of liquid slag in an EAF, that might have a reduction capacity and/or enhanced carbon dissolution in a molten ferro-alloy. The structural characterisation results are set forth in FIGS. 3 and 4.

EXAMPLES

Non-limiting examples of methods for producing a ferro-alloy will now be provided.

Example 1

Experimental Details:

The analyses of coke, polypropylene and rubber samples (the latter two absent any steel) were first summarized, as set forth in Table 1.

TABLE 1

| Analysis of Coke, Polypropylene and Rubber Metallurgical coke- Proximate analysis (%) | | |
|---|---|---|
| Volatiles | | 3.00 |
| Fixed carbon | | 78.70 |
| Ash | | 18.3 |
| Moisture | | 1.30 |
| Total sulphur | | 0.32 |
| Calorific Value MJ/kg | | 28.00-31.00 |
| Components | Polypropylene (PP) | Rubber |
| Carbon % | 83.8 | 85.48 |
| Hydrogen % | 13.9 | 6.96 |
| Sulphur % | 2.3 | 1.68 |
| Nitrogen % | — | 0.25 |
| Calorific Value MJ/kg | 45.00 | 40.16 |

The combustion studies were carried out with commercially available metallurgical coke. The polypropylene and tyre samples (Styrene Butadiene Rubber) were obtained from industry. Both polymeric materials were crushed in a jaw crusher and vibrating grinder to obtain a particle size less than 1.0 mm. The compositions of coke/polypropylene and coke/rubber mixtures investigated were—70:30, 80:20 and 90:10.

The combustion reactions were then carried out in a drop tube furnace (DTF), the schematic diagram of the DTF being shown in FIG. 1.

The operating parameters were fine tuned through repeated tests and the conditions were optimized. The operating conditions of the furnace employed are listed in Table 2.

TABLE 2

| Optimized experimental conditions | |
|---|---|
| Operating parameters | Values/condition |
| Temperature | 1200° C. |
| Particle size | Coke- PP/rubber - 0.1 mm |
| PP/PS preparation method | Crushed |
| Material injection rate | 0.05 g/s |
| Combustion air composition | 20% $O_2$; 80% $N_2$ |

The carbonaceous residual particles were collected at the bottom of the DTF and the carbon content was analyzed using a LECO analyzer.

The XRD patterns of coke, coke/rubber and coke/polypropylene mixtures were also investigated using a Siemens D5000 Powder diffractometer.

Results & Discussion

The combustion efficiencies of coke and its mixtures with PP and rubber at various ratios were calculated by the following formula:

$$\eta = \left(1 - \frac{A_0}{A_i}\frac{C_i}{C_0}\right) \times 100\%$$

where $A_0$ and $A_i$ are ash content before and after combustion, $C_0$ and $C_i$ represent the carbon content before and after combustion in the DTF.

Figure 2:
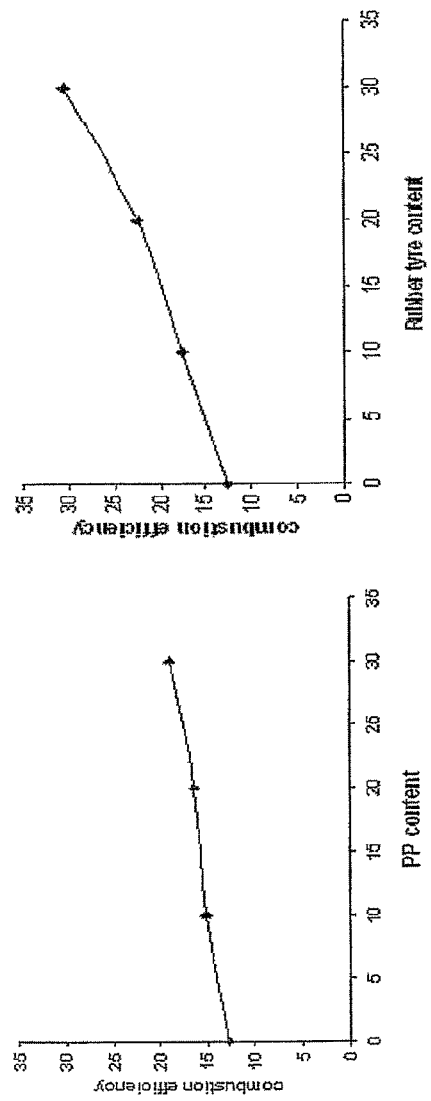
FIG. 2 plots, for polypropylene and tire rubber, combustion efficiency versus wt % content in a furnace additive mixture with coke, the values derived using the DTF of FIG. 1.

The combustion efficiency results obtained for the coke, coke/rubber mixture and coke/PP mixture were obtained and are collectively shown in FIG. 2.

Analysis of Properties of Plastics and Rubbers:

Polypropylene plastics and rubbers were able be functions as a potential supplementary fuel as seen from the analysis in Table 1, because of their relatively high calorific value. The observed beneficial properties of polypropylene and rubber included their volatile matter (released during combustion) and carbon content. Analysis also confirm enhanced volatiles and lower moisture contents of plastics and rubbers.

Polypropylene was noted to be a common waste thermoplastic with a simple backbone without any bulky groups, and therefore able to readily undergo a chain scission mechanism, giving highly reactive radicals, being a source of carbon and hydrogen.

The repeating unit of polypropylene is:

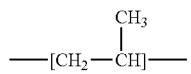

The thermal and thermo-oxidative degradation of polypropylene was noted to be a radical chain mechanism, being the reverse of the polymerization reaction. The oxidative degradation gave back highly reactive free radicals upon breakdown of the carbon-carbon bonds. Thus a radical chain initiated the degradation reaction, and proceeded through propagation.

Styrene-butadiene was noted to be a copolymer of 1,3-butadiene and styrene mixed in a 3 to 1 ratio, respectively. The repeating unit of SB rubber (SBR) is:

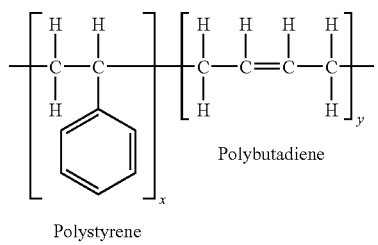

The mechanism and kinetics of rubber degradation at elevated temperatures took place in two steps. Until a temperature of 390° C. was reached, there was no change in the weight loss and mass degradation. The first step of degradation occurred in the temperature range 390° C.-520° C., where appreciable weight loss of up to 85% was observed, demonstrating the occurrence of a major degradation in this range. The second step of degradation occurred at 620° C.-720° C., where the weight loss in this region was 5.4%. Therefore rubbers were expected to undergo appreciable devolatilization, releasing volatiles at around 550° C.

Combustion Reaction:

In the combustion reaction, being a devolatilization reaction, polymeric products (Polypropylene or SB Rubber) were expected to decompose primarily into their monomer units, dimers and trimers.

Referring to the combustion efficiencies shown in FIG. 2, it will be seen that the efficiency was enhanced with increasing content of polypropylene/SBR, with the 70:30 composition of coke and polypropylene/SBR observed to have the highest efficiency.

In the combustion of polypropylene, more oxygen containing products were observed after reaching 600° C. The products were mostly of branched methyl ethyl ketone ($CH_3COR$) type. Compounds having their number of carbon atoms in multiples of three, from $C_3$ to $C_{15}$ were also prevalent. In any case, at higher EAF temperatures (>1000° C.) the availability of ketones was not pronounced and the amount of $CO_2$ and CO was greater. Thus, the polypropylene chains were expected to oxidatively degrade, initially into smaller compounds possessing oxygen atoms in their backbone, which then broke into simpler hydrocarbons and carbons at extreme temperatures.

Considering the combustion reactions of SB rubber, the gas chromatography mass spectrum analysis studies carried out earlier showed the formation of low molecular weight compounds like 4-phenyl cyclohexane, 4-vinyl cyclohexane, styrene, ethyl benzene, methyl benzene and methyl styrene. In earlier thermal degradation studies, the maximum temperature was 700° C. Therefore, it was inferred that a temperature of 700° C. was enough for rubber to become lower hydrocarbons, which further degraded into a simpler carbon source at still higher temperatures. Since the temperature inside the DTF was 1200° C., breakdown of polymeric chains was ensured, thereby enhancing the combustion efficiency of the coke/rubber mixture.

In both the cases of rubber and polypropylene, the high temperature of the furnace (1200° C.) ensured a breakdown of the polymeric chains into hydrocarbons, making them available for relatively faster combustion. The slightly higher combustion efficiency of rubbers over the polypropylene may be due to the direct conversion of macromolecules into smaller compounds, rather than undergoing a conversion through oxygen containing compounds, as in the case of polypropylene.

Figure 3:
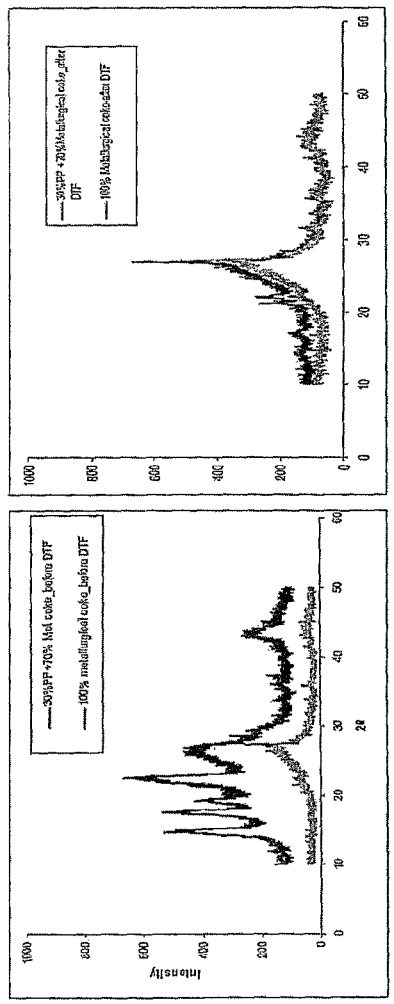
FIG. 3(*a*) respectively shows XRD spectra of a carbonaceous residue for coke, and for a 70% coke, 30% polypropylene mixture before and after being reacted in the drop tube furnace of FIG. 1.
Figure 3:
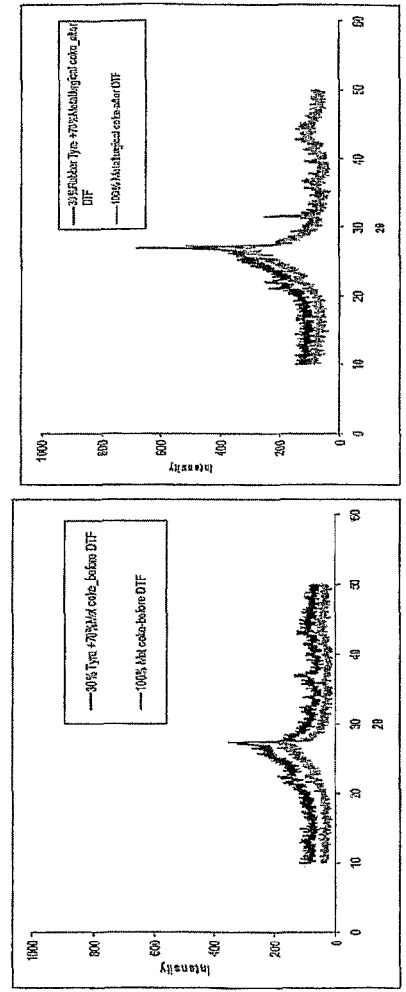

The XRD spectra of the coke and the 70:30 composition of coke and polypropylene/SBR mixtures, before and after combustion reaction, are shown in FIG. 3, with FIG. 3 specifically showing the XRD spectra of: (a) a 70:30 mixture of coke and polypropylene, before and after combustion; and (b) a 70:30 mixture of coke and SBR, before and after combustion. A 100% coke spectra, before and after combustion, is also shown for comparison.

In the case of the polypropylene mixture, characteristic peaks in the angular region of 15-25° revealed the amorphous content due do the polymeric inclusions. The significant reduction in these amorphous components can be seen from the XRD patterns of the burnt-out samples. Thus, the polypropylene fractions were expected to release volatiles during combustion. Nevertheless, in the after combustion sample patterns, small peaks still persisted, showing that the residues of carbonaceous matter from the plastic was left behind.

Figure 4:
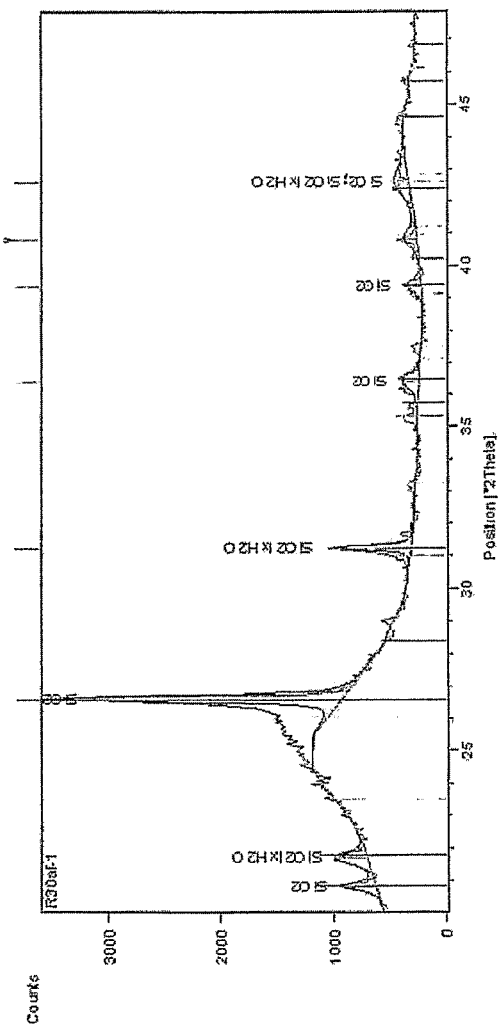
FIG. 4 shows the XRD pattern (peak analysis) for a 70% coke, 30% tire rubber (SBR) mixture after being reacted in the drop tube furnace of FIG. 1.

The XRD spectrum shown in FIG. 4 illustrates a peak analysis conducted for the sample containing coke/rubber, after combustion. It indicates the presence of carbonaceous and ash residues.

The crystallite sizes of mixtures, obtained after the combustion reaction, are compared with that for coke also combusted under the same conditions (Table 3). The results reflect that in the case of both coke/rubber and coke/Polypropylene after the combustion, the samples still show the presence of solid residues from the polymers (FIG. 3). This indicates that, although the combustion efficiency of the mixtures have improved (FIG. 2), the polymers are not completely consumed in the combustion reaction.

Crystallite size (Lc) measurements were made (Table 3—below) and showed that the carbon present in the residual samples of the mixtures originated from both coke and the polymers. This could be understood as follows. The Lc of coke is ~20 Å, whereas the coke/rubber residue has an Lc of ~18 Å indicating the presence of carbon residues that are, on an average, less ordered compared to coke. The coke/polypropylene residue has an Lc value of ~22 Å.

These analyses revealed that the residues contained some remnants of polymeric materials which resulted from their transformations into carbons as reflected by the overall carbon peaks and the associated Lc values. These Lc values were different to that of coke indicating that the carbonaceous residues that were left over after combustion originated from both coke and the polymeric materials. These residues were used in further slag foaming studies. The presence of waste polymeric remnants had a significant influence on slag foaming. The studies thus established an understanding of the use of organic wastes as an energy and carbon resource for EAF steelmaking.

TABLE 3

Calculated $L_c$ values

| Sample (after combustion) | Crystallite size ($L_c$) Å |
| --- | --- |
| 100% Metallurgical coke | 20.3 |
| 30% SB Rubber + 70% coke | 17.7 |
| 30% Polypropylene + 70% coke | 22.4 |

Conclusions:

The potential application of organic wastes, plastics or rubbers as a resource for EAF steel making was investigated by determining the combustion efficiencies of the coke/organic waste mixtures. The mixtures of metallurgical coke/SB rubber and metallurgical coke/polypropylene plastic showed combustion efficiencies better than coke alone. The remnants after combustion contained some carbon residues, which can also be utilized for slag foaming.

Based on the combustion results, and slag foaming studies, it was possible to use organic waste in EAF steelmaking to replace metallurgical coke usage due to the enhanced combustion efficiency. The findings of combustion efficiency and slag foaming reflected that these waste materials were valuable energy and carbon resources for EAF steelmaking.

Example 2

The inventor conceived of and proposed an index to indicate the suitability of a rubber for its re-use in ferro-alloy production and as a combustible fuel in other non-blast-type furnaces. The index was referred to as the Green Index for Rubber (or "GIR" index). The inventor conceived that the index could also be used in a general sense as relating to recyclability of rubber, and yet still be known as the GIR index.

In this way, a mechanism could be established by which the general public could recognise the ability of a rubber to be recycled, for example in ferro-alloy production such as steel-making.

Finally the inventor surmised that the GIR index could then be built upon by developing a related ORS index, where the "S" stands for and indicates the suitability of the plastic for use in steelmaking.

In general, the experiments also indicated, that for the production of ferro-alloys other than steel, and using an EAF, a rubber could be charged into the furnace, could combust as a fuel, and could form carbonaceous residues useful for slag foaming, and to cause metal oxide reduction, and recarburisation of molten metal (eg. iron).

In addition, the experiments also indicated that for reheating furnaces and the like, the rubber could be charged into the furnace, for example as a supplement to other fuels such as natural gas, and yet still combust as a fuel. This was especially so at the higher temperatures (greater than 1000° C.) used in furnaces such as reheating furnaces in steel forming operations.

Thus, an effective means for using and consuming the vast quantities of waste plastics in society is provided.

Whilst a number of specific embodiments have been described, it should be appreciated that the method for producing a ferro-alloy can be embodied in many other forms.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments.

A reference herein to a prior art document is not an admission that the document forms part of the common general knowledge of a person of ordinary skill in the art in Australia or elsewhere.

The invention claimed is:

1. A method for producing a ferro-alloy in an electric arc furnace, the method comprising the steps of:
    (i) removing and separating steel from a comminuted carbon-containing organic material that comprises steel, to produce a carbon-containing organic material that is absent the steel; and
    (ii) charging the furnace undergoing steel production with the product produced in step (i), namely, the comminuted carbon-containing organic material absent steel.

2. The method as claimed in claim 1, wherein the carbon-containing organic material is:
    a rubber material; or
    a polymer from a steel reinforced polymer composite.

3. The method as claimed in claim 1, wherein the material is comminuted by one or more of slitting, shredding, chipping, grinding or crumbing the material.

4. The method as claimed in claim 3, wherein the material is comminuted so as to produce a particle size of less than about 1 mm.

5. The method as claimed in claim 1, wherein removing the steel comprises subjecting the comminuted material to a magnetic field to magnetically remove the steel from the remainder of the comminuted product.

6. The method as claimed in claim 1, wherein the source of the carbon-containing organic material is a tire.

7. The method as claimed in claim 1, wherein the carbon-containing organic material is charged into the furnace with another source of carbon.

8. The method as claimed in claim 1, wherein the other source of carbon is coal, coke, carbon char, charcoal or graphite.

9. The method as claimed in claim 7, wherein the carbon-containing organic material and other source of carbon are charged into the furnace in approximate weight ratios of 1:1, 3:7, 1:4, or 1:9.

10. The method as claimed in claim 1, wherein the carbon-containing organic material is a waste material.

11. A method of producing a ferro-alloy in an electric arc furnace, comprising charging the furnace with a carbon-containing organic material from which steel has been removed to enhance EAF combustion efficiency.

12. The method as claimed in claim 11 comprising the steps of:
 (i) removing steel from a comminuted carbon-containing organic material that comprises steel; and
 (ii) charging the furnace with the comminuted carbon-containing organic material that is produced in step (i).

13. A method for producing a ferro-alloy in an electric arc furnace, the method comprising the steps of:
 charging the furnace with feedstock for the ferro-alloy;
 heating the feedstock in the furnace to a molten state; and
 charging the furnace with a comminuted carbon-containing organic material from which steel has been removed and separated therefrom.

14. The method as claimed in claim 13, wherein the material is comminuted by one or more of slitting, shredding, chipping, grinding or crumbing the material.

15. The method as claimed in claim 13, wherein the carbon-containing organic material is charged with another source of carbon and/or with the feedstock to the furnace.

16. The method as claimed in claim 15, wherein the other source of carbon is coal, coke, carbon char, charcoal or graphite.

* * * * *

UNITED STATES PATENT AND TRADEMARK OFFICE
CERTIFICATE OF CORRECTION

PATENT NO. : 8,070,849 B2  Page 1 of 1
APPLICATION NO. : 12/596772
DATED : December 6, 2011
INVENTOR(S) : Sahajwalla It is certified that error appears in the above-identified patent and that said Letters Patent is hereby corrected as shown below:

Column 10, Line 65, Claim 8, delete "claim 1" and insert -- claim 7 --

Signed and Sealed this
Twenty-seventh Day of March, 2012

David J. Kappos
*Director of the United States Patent and Trademark Office*